(12) United States Patent
Kim et al.

(10) Patent No.: US 12,684,534 B2
(45) Date of Patent: Jul. 14, 2026

(54) BASE STATION DEVICE, USER EQUIPMENT DEVICE, AND RS CONFIGURATION CONTROL METHOD PERFORMED IN EACH DEVICE

(71) Applicant: SK TELECOM CO., LTD., Seoul (KR)

(72) Inventors: Kang Ho Kim, Seoul (KR); Min Soo Na, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 633 days.

(21) Appl. No.: 18/086,804

(22) Filed: Dec. 22, 2022

(65) Prior Publication Data

US 2023/0422215 A1 Dec. 28, 2023

(30) Foreign Application Priority Data

Jun. 28, 2022 (KR) ........................ 10-2022-0078935

(51) Int. Cl.
| | |
|---|---|
| *H04W 72/02* | (2009.01) |
| *H04L 5/00* | (2006.01) |
| *H04W 24/08* | (2009.01) |
| *H04W 72/0446* | (2023.01) |

(52) U.S. Cl.
CPC ........... *H04W 72/02* (2013.01); *H04L 5/0051* (2013.01); *H04W 24/08* (2013.01); *H04W 72/0446* (2013.01)

(58) Field of Classification Search
CPC ............. H04W 72/02; H04W 72/0446; H04W 72/1268; H04W 72/1273; H04W 72/232; H04W 24/08; H04L 5/0051; H04L 5/0048; H04L 5/0094

USPC ................................................... 370/329–330
See application file for complete search history.

(56) References Cited

U.S. PATENT DOCUMENTS

| | | | | |
|---|---|---|---|---|
| 2018/0176059 A1* | 6/2018 | Medles | ................ | H04W 72/54 |
| 2020/0163104 A1* | 5/2020 | Du | .................... | H04W 72/1268 |
| 2020/0322887 A1* | 10/2020 | Pao | ........................ | H04W 24/10 |
| 2020/0351053 A1* | 11/2020 | Werner | .............. | H04L 25/0226 |
| 2021/0274558 A1* | 9/2021 | Takata | ................. | H04B 7/0456 |
| 2022/0123853 A1* | 4/2022 | Chandran | ............ | H04L 5/0085 |
| 2022/0166566 A1* | 5/2022 | Kumar | .................. | H04L 5/0094 |
| 2022/0407652 A1* | 12/2022 | Lee | ....................... | H04L 5/0048 |
| 2023/0096382 A1* | 3/2023 | Levitsky | ............. | H04B 17/336 |
| | | | | 370/329 |

FOREIGN PATENT DOCUMENTS

| | | |
|---|---|---|
| KR | 10-2019-0039339 A | 4/2019 |
| KR | 10-2021-0111996 A | 9/2021 |

OTHER PUBLICATIONS

Office Action issued on Jan. 7, 2025 for corresponding Korean Patent Application No. 10-2022-0078935 along with an English translation (10 pages).

* cited by examiner

*Primary Examiner* — Candal Elpenord

(74) *Attorney, Agent, or Firm* — Hauptman Ham, LLP

(57) ABSTRACT

Provided are method and devices which apply an optimal DMRS configuration for each slot unit to which a DMRS is allocated, and guarantee both resources for data transmission of a PDSCH/PUSCH and stability of transmission or reception based on the accuracy of channel estimation in balance, thereby increasing transmission quality and throughput.

15 Claims, 7 Drawing Sheets

[UE device]                    [BS device]

FIG. 3

[DCI w/ DMRS Config Index '01']

| Field (Item) | Value |
|---|---|
| Identifier for DCI formats | ... |
| Frequency domain resource assignment | ... |
| Time domain resource assignment | ... |
| VRB-to-PRB mapping | ... |
| Modulation and coding scheme | ... |
| New data indicator | ... |
| Redundancy version | ... |
| HARQ process number | ... |
| Downlink assignment index | ... |
| TPC command for scheduled PUCCH | ... |
| PUCCH resource indicator | ... |
| PDSCH-to-HARQ_feedback timing indicator | ... |
| DMRS Configuration Index | 01 |

[RRC Connection Reconfigration]

DmrsConfifToAddModList
dmrsConfigID 1,
dmrsConfig
    dmrs-Type type2,
    maxLength len2,
    scramblingID0 83,
    scramblingID1 83,
    ...
,
dmrsConfigID 2,
dmrsConfig
    dmrs-AdditionalPosition pos3,
    scramblingID0 53,
    scramblingID1 112,
    ...
,
dmrsConfigID 3,
dmrsConfig
    dmrs-Type type2,
    dmrs-AdditionalPosition pos1,
    maxLength len2,
    ...
,    ...

[Scheduled DMRS Configuration]

Subcarrier

Symbol

Slot Index

BASE STATION DEVICE, USER EQUIPMENT DEVICE, AND RS CONFIGURATION CONTROL METHOD PERFORMED IN EACH DEVICE

CROSS-REFERENCE TO RELATED APPLICATION(S)

The instant application is based on and claims priority to Korean Patent Application No. 10-2022-0078935, filed on Jun. 28, 2022. The disclosure of above-listed application is incorporated by reference herein in its entirety.

BACKGROUND OF THE INVENTION

1. Field of the Invention

The present disclosure relates to technology for transmitting demodulate reference signal (DMRS).

The present disclosure proposes an adaptive DMRS configuration control scheme for improving the quality of transmission by applying an optimal DMRS configuration.

2. Description of the Prior Art

A demodulate reference signal (DMRS) is a reference signal (RS) used for estimating a channel value needed for demodulating transmitted data.

The DMRS may be transmitted by being configured in a predetermined symbol of each slot in which a physical downlink shared channel (PDSCH) and a physical uplink shared channel (PUSCH) are scheduled.

In 5G (NR) that takes beamforming as core technology, a DMRS is considered significantly important, and 3GPP Release 18 corresponding to 5G-advance has been discussing of improvement of a DMRS via a work item.

The DMRS may be configured in various forms to be appropriate for the purpose by selecting a symbol length, the number of symbols, a location in a slot, the number of ports, or the like.

According to the present standard, DMRS configuration information associated with a DMRS configuration may be transferred to a UE in bandwidth parts (BWP) via an RRC message.

In addition, the number of DMRS symbols and the number of resource elements (REs) transmitted in one slot may vary according to a DMRS configuration.

When DMRS resources increase by increasing the number of DMRS symbols and Res, the accuracy of channel estimation and the stability of transmission or reception may be improved. However, the amount of data capable of being contained in a PDSCH/PUSCH is decreased, and thus may cause a decrease in transmission quality and throughput.

Conversely, when DMRS resources decrease by decreasing the number of DMRS symbols and Res, the amount of data capable of being contained in a PDSCH/PUSCH may be increased but the accuracy of channel estimation and stability of transmission or reception is decreased, and thus a decrease in transmission quality and throughput may be even caused.

That is, at present, there is still a limitation in determining/applying an optimal DMRS configuration that guarantees both resources for data transmission of a PDSCH/PUSCH and the stability of transmission or reception based on accuracy of channel estimation in balance.

Accordingly, the present disclosure provides a scheme that increases transmission quality and throughput by guaranteeing both resources for data transmission of a PDSCH/PUSCH and the stability of transmission or reception of the accuracy of channel estimation in balance.

SUMMARY OF THE INVENTION

An aspect of the present disclosure is to realize technology that enables application of an optimal DMRS configuration in units of slots, so as to guarantee, in balance, both the resources for data transmission of a PDSCH/PUSCH and the stability of transmission or reception associated with the accuracy of channel estimation, thereby increasing transmission quality and throughput.

In view of the foregoing, a base station device according to an embodiment of the disclosure may include a candidate selecting unit configured to select a candidate reference signal (RS) configuration based on a transmission environment associated with a user equipment (UE), and a configuration controller configured to perform a procedure that applies the candidate RS configuration to at least one of slots to which a predetermined RS configuration for the UE is applied, and to determine an optimal RS configuration between the predetermined RS configuration for the UE and the candidate RS configuration.

A user equipment (UE) device according to an embodiment of the disclosure may include a configuration identifying unit configured to identify, from downlink control information (DCI) transferred from a base station for scheduling, a configuration for reference signal (RS) transmission, and a controller configured to process the RS by applying the identified RS configuration in a case of a downlink and an uplink, and the RS configuration identified from the DCI is an optimal RS configuration determined, by the base station with respect to each slot for the RS transmission to the UE device.

A reference signal (RS) configuration control method performed by a base station device according to an embodiment of the disclosure may include a candidate selection operation that selects, based on a transmission environment associated with a user equipment (UE), a candidate RS configuration, and a configuration control operation that performs a procedure of applying the candidate RS configuration to at least one of slots to which a predetermined RS configuration for the UE is applied, and determining an optimal RS configuration between the predetermined RS configuration for the UE and the candidate RS configuration.

A reference signal (RS) configuration control method performed by a user equipment (UE) device according to an embodiment of the disclosure may include a configuration identification operation that identifies, in downlink control information (DCI) transferred from a base station for scheduling, a configuration for RS transmission, and a control operation that controls the RS by applying the identified RS configuration in a case of a downlink and an uplink, and an optimal RS configuration is determined by the base station with respect to each slot for the RS transmission to the UE device.

Therefore, according to a base station device, a user equipment (UE) device, and an RS configuration control method performed in each device, by realizing technology that applies an optimal DMRS configuration based on each slot unit to which a DRMS is allocated, both resources for data transmission of a PDSCH/PUSCH and the stability of transmission or reception associated with the accuracy of channel estimation may be guaranteed in balance, and thus transmission quality and throughput may be increased.

BRIEF DESCRIPTION OF THE DRAWINGS

The above and other aspects, features, and advantages of the present disclosure will be more apparent from the following detailed description taken in conjunction with the accompanying drawings, in which:

FIG. 3 is a diagram illustrating an example of a process of applying a DMRS configuration according to a DCI-based dynamic DMRS configuration control scheme that is additionally proposed in the present disclosure.

DETAILED DESCRIPTION OF THE EXEMPLARY EMBODIMENTS

Figure 1:
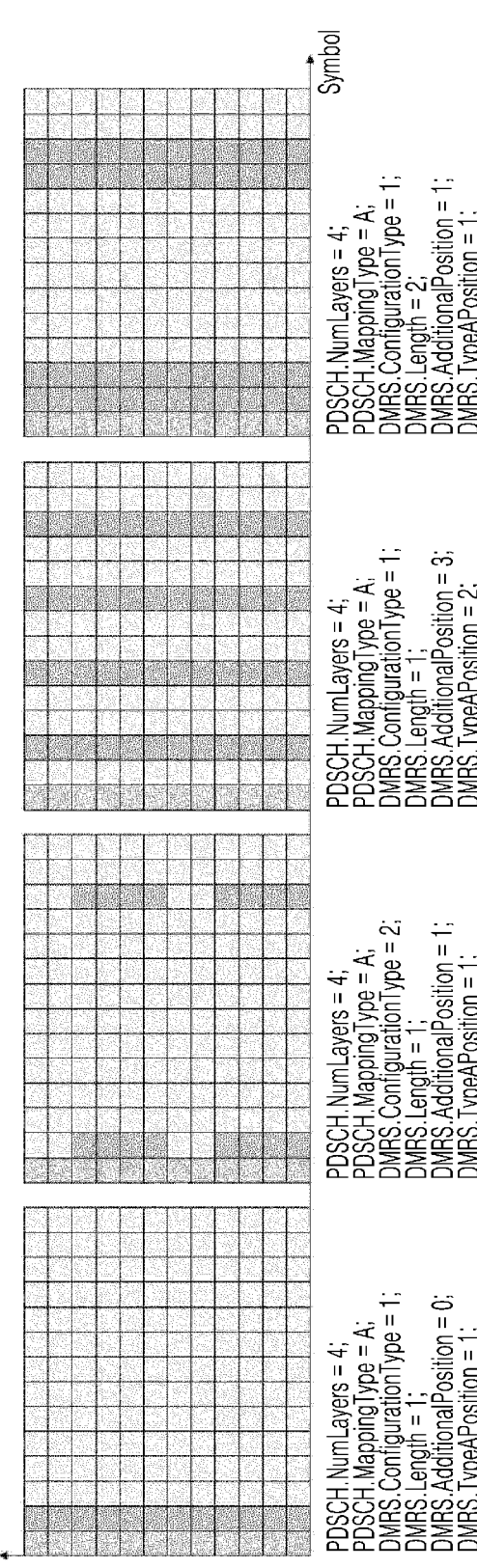
FIG. 1 is a diagram illustrating various types of DRMS configurations.

The technical terms used in the present disclosure are only used to describe specific embodiments, and are not intended to limit the technical idea of the present disclosure. Unless defined otherwise in the present disclosure, the technical terms as used herein should be interpreted to have the same meaning as those commonly understood by a person skilled in the art to which the present disclosure pertains, and are not to be interpreted to have excessively comprehensive or excessively reduced meanings. Furthermore, when the technical terms as used herein are erroneous technical terms that fail to accurately express the technical idea of the present disclosure, they should be interpreted as alternative technical terms that can be correctly understood by a person skilled in the art. Furthermore, general terms as used herein should be interpreted to have the meanings defined in dictionaries or the contextual meanings in the relevant field of art, and are not to be interpreted to have excessively reduced meanings.

A singular expression used herein may include a plural expression unless they are definitely different in the context. As used herein, such an expression as "comprises" or "include" should not be interpreted to necessarily include all elements or all steps described in the specification, and should be interpreted to be allowed to exclude some of them or further include additional elements or steps.

The terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the present disclosure.

Hereinafter, embodiments of the present disclosure will be described in detail with reference to the accompanying drawings. Regardless of reference signs, the same or like elements are provided with the same or like reference signs in the drawings, and repetitive descriptions thereof will be omitted.

In describing the technology of the present disclosure, a detailed description of known functions or configurations incorporated herein will be omitted when it is determined that the description may make the subject matter of the disclosure unclear. Furthermore, it should be noted that the accompanying drawings are merely for the purpose of easy understanding of the technical idea of the present disclosure, and are not to be interpreted to limit the technical idea.

Hereinafter, embodiments of the present disclosure will be described with reference to the accompanying drawings.

The present disclosure relates to demodulate reference signal (DMRS) transmission technology.

Specifically, the present disclosure proposes an adaptive DMRS configuration control scheme for improving the quality of transmission by applying an optimal DMRS configuration.

A DMRS is a reference signal (RS) used for estimating a channel value needed for demodulating transmission data.

The DMRS may be configured in a predetermined symbol for each slot in which a physical downlink shared channel (PDSCH) and a physical uplink shared channel (PUSCH) are scheduled, and may be transmitted.

In 5G (NR) that takes beamforming as core technology, a DMRS is considered significantly important, and 3GPP Release 18 corresponding to 5G-advance discusses improvement of a DMRS via a work item.

The DMRS may be configured in various forms to be appropriate for the purpose by selecting a symbol length, the number of symbols, a location in a slot, the number of ports, or the like.

According to the present standard, DMRS configuration information associated with a DMRS configuration may be transferred to a UE in units of bandwidth parts (BWP) via an RRC message.

FIG. 1 is a diagram illustrating examples of various types of DMRS configurations.

The number of DMRS symbols and the number of resource elements (REs) transmitted in one slot may vary according to a DMRS configuration.

Referring to FIG. 1, the number of DMRS symbols in a slot may differ depending on a dmrs-AdditionalPosition value.

For example, in the case of maxLength=1, the number of DMRS symbols is variable from 1 at the lowest estimate to 4 at the highest estimate, and the number of REs in a DMRS symbol may also be variable depending on a DMRS configuration type.

An increase of DMRS resource associated with an increase in the number of DMRS symbols and REs may increase the accuracy of channel estimation and may increase the stability of transmission or reception. However, the amount of data capable of being contained in a PDSCH/PUSCH is decreased, and thus may cause a decrease in transmission quality and throughput.

Conversely, in the case of a decrease in DMRS resources associated with a decrease in the number of DMRS symbols and the number of REs per symbol, the amount of data capable of being contained in a PDSCH/PUSCH may be increased but the accuracy of channel estimation is decreased, and thus stability of transmission or reception may be decreased and a decrease in transmission quality and throughput may be even caused.

That is, at present, there is still a limitation in determining/applying an optimal DMRS configuration that guarantees both resources for data transmission of a PDSCH/PUSCH and the stability of transmission or reception based on accuracy of channel estimation in balance.

Accordingly, the present disclosure provides a new adaptive DMRS configuration control scheme that is capable of increasing transmission quality and throughput by guaranteeing both resources for data transmission of a PDSCH/PUSCH and the stability of transmission or reception of the accuracy of channel estimation in balance.

Hereinafter, referring to FIG. 2, the configurations of a base station device and a user equipment (UE) device that implement a new type of adaptive DMRS configuration control scheme proposed in the present disclosure will be described in detail.

Before describing in detail, the present disclosure may be applicable to both 4G (LIE) and 5G (NR), and may be extended and applicable to 6G and the like.

In the descriptions hereinafter, for ease of description, the features and various embodiments of the present disclosure will be described based on the NR standard.

Figure 2:
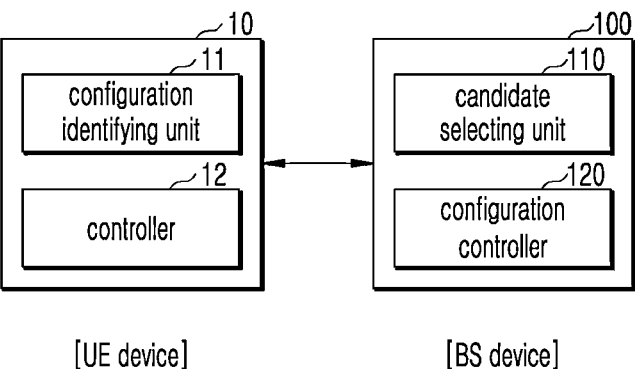
FIG. 2 is a diagram illustrating the configurations of a base station device and a user equipment (UE) device according to an embodiment of the present disclosure.

Referring to FIG. 2, the configuration of the base station device 100 according to an embodiment of the present disclosure will be described in detail.

As described in FIG. 2, the base station device 100 according to an embodiment of the present disclosure may include a candidate selecting unit 110, and a configuration controller 120.

The entirety or at least a part of the configuration of the base station device 100 may be embodied in the form of a hardware module or a software module, or may be embodied in the form of a combination of a hardware module and a software module.

Here, the software module may be considered as, for example, an instruction executed by a processor that controls an operation in the base station device 100, and such an instruction may be in the form of being contained in memory in the base station device 100.

Via the above-described configuration, the base station device 100 according to an embodiment of the present disclosure may realize the adaptive DMRS configuration control scheme proposed in the present disclosure.

Hereinafter, each configuration of the base station device 100 of the present disclosure will be described in detail.

The candidate selecting unit 110 may perform a function of selecting a candidate RS configuration based on a transmission environment associated with the UE 10.

In this instance, an RS for which a candidate configuration is to be selected may be a DMRS used for channel estimation for demodulating data transmitted in at least one of a PDSCH and a PUSCH.

Hereinafter, for ease of description, detailed embodiments will be described by considering an RS as a DMRS.

The candidate selecting unit 110 may select a candidate DMRS configuration based on a transmission environment associated with the UE 10.

The configuration controller 120 is in charge of a function of performing a procedure that applies the candidate DMRS configuration to some slots among slots to which a predetermined DMRS configuration for the UE 10 is applied, and determines an optimal DMRS configuration between the predetermined DRMS configuration for the UE 10 and the candidate DMRS configuration.

In the present disclosure, in order to determine/apply a DMRS configuration in units of slots by distinguishing some slots, a predetermined slot to be described later, and the like, an environment in which a DMRS configuration is controlled at a slot level may be assumed.

In the present disclosure, the detailed technology that realizes an environment in which a DMRS configuration is controllable at a slot level is not limited.

However, hereinafter, technology (hereinafter, a DCI-based dynamic DMRS configuration control scheme) that is additionally proposed in the present disclosure to embody such an environment will be described first.

In the present disclosure, the base station device 100 may transfer a DCI to the UE 10 via a PDCCH, and may also transfer DMRS configuration information determined by the configuration controller 120.

In the descriptions of a detailed embodiment, the present disclosure basically uses a scheme of transferring DMRS configuration information to the UE 10 using a PDCCH (particularly, a DCI).

More particularly, a scheme of additionally defining a predetermined field (DMRS configuration index) in DCI transmitted in a PDCCH, or a scheme of additionally defiling and utilizing a new DCI format may be embodied.

To this end, in the present disclosure, the base station device 100 may transfer a DMRS configuration list including a plurality of pieces of DMRS configuration information to the UE 10.

For example, when the UE 10 accesses, the base station device 100 may identify, based on a UE capability information message, whether the UE 10 is capable of supporting the DCI-based (dynamic) DMRS configuration control proposed in the present disclosure, and may transfer a DMRS configuration list to the UE 10 via an RRC message (e.g., rrcConnectionReconfiguration Message) if supportable.

In the case that the UE 10 is incapable of supporting the DCI-based (dynamic) DMRS configuration control proposed in the present disclosure, the base station device 100 may not transmit a DMRS configuration list, and may transfer DMRS configuration information to the corresponding UE in units of BWPs via an RRC message according to an existing scheme.

That is, according to the existing scheme, the DMRS configuration information may be transferred via an RRC message as shown in Table 1 below.

TABLE 1

| DMRS-DownlinkConfig ::= | SEQUENCE { |
| --- | --- |
| dmrs-Type | ENUMERATED {type2} |
| dmrs-AdditionalPosition | ENUMERATED {pos0, pos1, pos3} |
| maxLength | ENUMERATED {len2} |
| scramblingID0 | INTEGER (0..65535) |
| scramblingID1 | INTEGER (0..65535) |
| phaseTrackingRS | SetupRelease { PTRS-DownlinkConfig } |
| ... | |
| } | |

Conversely, in the present disclosure, via an RRC message as shown in Table 2 below, a DMRS configuration list including a plurality of pieces of DMRS configuration information having dmrsConfigIDs respectively assigned, may be transmitted.

TABLE 2

```
DmrsConfigToAddModList ::= SEQUENCE (SIZE (1..maxDmrsConfigId)) OF DmrsConfigToAddMod
DmrsConfigToAddMod ::=          SEQUENCE {
  dmrsConfigId                    DmrsConfigId
  dmrsConfig ::=                  SEQUENCE {
    dmrs-Type                       ENUMERATED {type2}
    dmrs-AdditionalPosition         ENUMERATED {pos0, pos1, pos3}
    maxLength                       ENUMERATED {len2}
    scramblingID0                   INTEGER (0..65535)
    scramblingID1                   INTEGER (0..65535)
    phaseTrackingRS                 SetupRelease { PTRS-DownlinkConfig }
    ...
  }
}
```

In the present disclosure, even in the case that a DMRS configuration list needs to be changed for the UE 10 that is in the call connection state, the base station device 100, via an RRC message (e.g., rrcConnectionReconfiguration Message), may add DMRS configuration information (e.g., add DMRS configuration information of dmrsConfigID 4) to the DMRS configuration list, may correct DMRS configuration information (e.g., correct DMRS Configuration information_ dmrs-AdditionalPosition of dmrsConfigID 2) in the DMRS configuration list, may remove DMRS configuration information (remove DMRS configuration information of dmrsConfigID 2) from the DMRS configuration list, or may remove the DMRS configuration list itself.

Through the above, in the present disclosure, the DMRS configuration list transferred via the RRC message may be stored/contained in the UE 10 in the form of Table 3 below.

TABLE 3

```
DmrsConfigToAddModList
  dmrsConfigID 1,
  dmrsConfig
    dmrs-Type type2,
    maxLength len2,
    scramblingID0 83,
    scramblingID1 83,
    ...
  ,
  dmrsConfigID 2,
  dmrsConfig
    dmrs-AdditionalPosition pos3,
    scramblingID0 53,
    scramblingID1 112,
    ...
  ,
  dmrsConfigID 3,
  dmrsConfig
    dmrs-Type type2,
    dmrs-AdditionalPosition pos1,
    maxLength len2,
    ...
  ,
  ...
  ,
```

In addition, in the present disclosure, a predetermined field may be additionally defined in DCI transmitted in a PDCCH, or a new DCI format for transferring DMRS configuration information may be additionally defined.

Various types of formats are defined for a DCI according to purpose of use.

According to an embodiment, as illustrated in FIG. 3, in the present disclosure, a predetermined field (DMRS configuration index) may be additionally defined and utilized in DCI Format 1_0 used for transferring PDSCH scheduling information.

In this instance, in the present disclosure, the base station device 100 may transfer DMRS configuration information determined by the configuration controller 120 using a predetermined field (DMRS configuration index) that is additionally defined in DCI (e.g., DCI Format 1_0) transferred to the UE 10.

That is, the base station device 100 may transfer the DMRS configuration information to the UE 10 in a manner of setting the index of the DMRS configuration information determined by the configuration controller 120 in a predetermined field (DMRS configuration index) additionally defined in DCI (e.g., DCI Format 1_0) transferred to the UE 10, and enabling the UE 10 to identify, from the DMRS configuration list, the DMRS configuration information mapped to the index included in the predetermined field (DMRS configuration index) in the DCI.

Such a predetermined field, that is, a DMRS configuration index field, may be a field defined to transfer the index of DMRS configuration information, and the bit size of the DMRS configuration index field may vary depending on the number of pieces of DMRS configuration information (e.g., maxDmrsConfigId) included in the above-described DMRS configuration list.

For example, in the case that maxDmrsConfigId is 4, that is, in the case that the number of pieces of DMRS configuration information included in the DMRS configuration list is 4, the bit size of the DMRS configuration index field may be 2 bits.

Accordingly, describing with reference to FIG. 3, the base station device 100 may set index "01" of DMRS configuration information determined in advance in a predetermined field (DMRS configuration index) in DCI (e.g., DCI Format 1_0) transferred to the UE 10.

In this instance, from the DMRS configuration list in an RRC message (e.g., rrcConnectionReconfiguration Message) received in advance, the UE 10 may identify DMRS configuration information "dmrsConfigID 2" to which index "01" is mapped that is included in the predetermined field (DMRS configuration index) in the DCI transmitted via a PDCCH, and may obtain the corresponding DMRS configuration information.

In the case of a downlink and an uplink, the UE 10 may process a DMRS by applying a DMRS configuration based on the corresponding DMRS configuration information.

As described above, in the present disclosure, a DCI-based dynamic DMRS configuration control scheme that transfers DMRS configuration information using a transmitted DCI including scheduling information associated with a PDSCH/PUSCH may be implemented for a DMRS that is configured for each slot in which a PDSCH and a PUSCH are scheduled and is transmitted, and thus an environment in which a DMRS configuration is applicable/controllable based on a slot unit (slot level) in which a DCI is capable of being transmitted may be embodied.

In the above-description, in association with embodying the DCI-based dynamic DMRS configuration control scheme of the present disclosure, an embodiment that applies/controls a DMRS configuration at a slot level by transmitting DMRS configuration information together with scheduling associated with an S-CH (PDSCH or PUSCH) to the UE 10, via DCI format update that additionally defines a predetermined field (DMRS configuration index) in an existing DCI format (e.g., DCI Format 1_0) has been described.

In addition, in association with embodying a DCI-based dynamic DMRS configuration control scheme of the present disclosure, an embodiment that applies/controls a DMRS configuration at a slot level by transmitting DMRS configuration information together with scheduling associated with an S-CH (PDSCH or PUSCH) to the UE 10, in a manner of additionally defiling a new DCI format for transmitting DMRS configuration information may also be available.

Hereinafter, a procedure that embodies the DCI-based DMRS configuration update of the present disclosure via the above-described DCI-based dynamic DMRS configuration control scheme will be described in detail.

After transmitting DMRS configuration information to the UE 10, a situation that requires change of the DMRS configuration information may occur.

In this instance, according to the existing (present standard) method, is the change of the DMRS configuration may be processed in a manner of updating the DMRS configuration information for a UE via an RRC message, or switching a UE to a BWP in which a DMRS desired to obtain via changing is configured.

Conversely, in the present disclosure, DCI-based DMRS configuration update may be embodied via the above-described DCI-based dynamic DMRS configuration control scheme.

That is, in the case that change to DMRS configuration information for the UE 10 is needed, the base station device 100, after identifying the need, may set the index (e.g., "02") of the DMRS configuration information that is obtained (to be obtained) via changing in a predetermined field (DMRS configuration index) in DCI according to a new DCI format for update, and may perform transmission via a PDCCH in which the fastest transmission of the corresponding DCI is capable of being performed.

In this instance, the present disclosure newly defines a DCI according to the new DCI format, that is, the above-described new DCI format for update, and a DMRS-radio network temporary identifier (RNTI) for scrambling and transmission.

Accordingly, in the present disclosure, the base station device 100 may transmit a DCI according to the new DCI format for update by scrambling with a DMRS-RNTI, and thus may enable the UE 10 to identify that the DCI is a DCI for DMRS configuration update.

In this instance, the UE 10 may recognize the DMRS-RNTI scrambled with the DCI transmitted via a PDCCH, and may identify that the DCI is a DCI according to a new DCI format for update that is transmitted for DMRS configuration update.

From a DMRS configuration list in an RRC message (e.g., rrcConnectionReconfiguration Message) received in advance, the UE 10 may identify DMRS Configuration information "dmrsConfigID 3" to which index "02" included in a predetermined field (DMRS configuration index) in the DCI is mapped, may obtain and update with the corresponding DMRS configuration information, and may process a DMRS by applying a DMRS configuration according to the corresponding DMRS configuration information in the case of a downlink and an uplink.

As described above, in the present disclosure, an environment in which a DMRS configuration may be applied/controlled based on a slot unit (slot level) in which a DCI is capable of being transmitted, via the new type of DCI-based dynamic DMRS configuration control scheme.

Accordingly, the present disclosure may enable the DCI-based DMRS configuration update, and thus it is expected to be free from limitations of the existing RRC message or BWP switching-based DMRS configuration update scheme.

However, embodiment of the scheme provided in the present disclosure is not limited only to embodiment via the DCI-based dynamic DMRS configuration control scheme. The scheme of the present disclosure may be employed by combining with various methods capable of allocating DMRSs having different configurations at a slot level, such as producing a DMRS pattern and performing update via an RRC message.

The adaptive DMRS configuration control scheme proposed in the present disclosure will be described again.

As described above, the candidate selecting unit 110 may select a candidate DMRS configuration based on a transmission environment associated with the UE 10.

A detailed embodiment associated with a scheme of selecting a candidate DMRS configuration will be described as follows.

In the present disclosure, a transmission environment associated with the UE 10 may be determined based on at least one of the amount of transmission data of the UE 10 (i.e., the amount of data to be transmitted via a PDSCH/PUSCH), a movement speed of the UE 10, and a success rate of data transmission to the UE 10.

Therefore, the candidate selecting unit 110 may select, as a candidate, a DMRS configuration having a larger number of symbols of a DMRS transmitted in a slot than that of a predetermined DMRS configuration for the UE 10, in the case of an environment having a small amount of transmission data of the UE 10, an environment having a fast movement speed, or an environment having a low success rate of data transmission.

Figure 4:
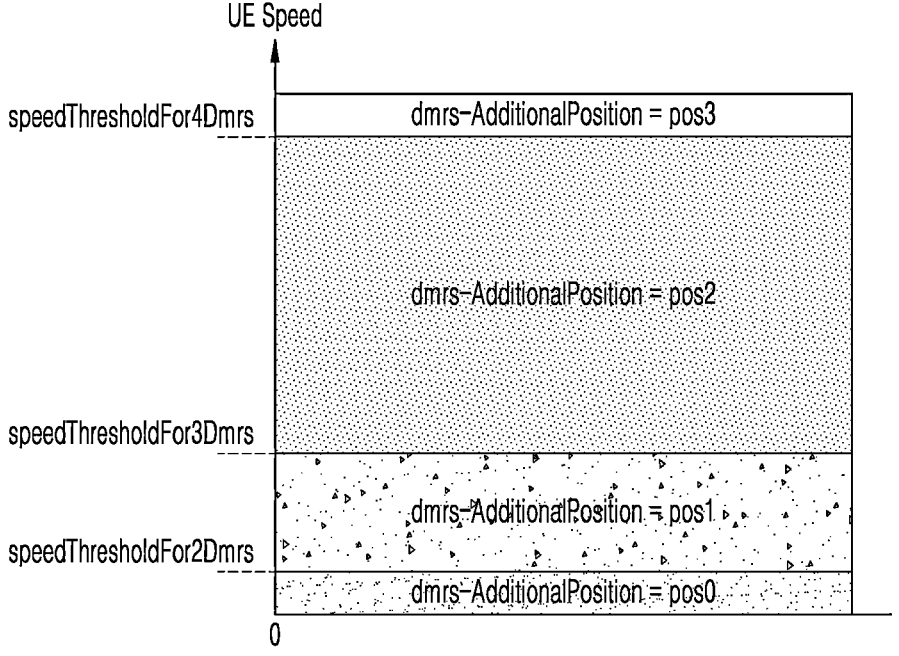
FIGS. 4 and 5 are diagrams illustrating embodiments of selecting a candidate DMRS configuration in the present disclosure.

Referring to FIG. 4, an embodiment will be described with reference to a transmission environment based on the movement speed of the UE 10. This is based on the fact that the number of DMRS symbols is increased in a section in which the UE moves in high speed, and transmission and reception performance is increased.

For example, in the present disclosure, a candidate DMRS configuration may be selected via a scheme that differentially applies, based on the movement speed of a UE, a dmrs-AdditionalPosition value related to the number of DMRS symbols.

For example, a threshold for a movement speed (UE speed) may be differentially defined for differential application, for example, speedThresholdFor2Dmrs, speedThresholdFor3Dmrs, and speedThresholdFor4Dmrs, as illustrated in FIG. 4.

Accordingly, the base station device 100 (particularly, a DU) may recognize the movement speed of the UE 10 (UE speed) via various existing schemes capable of recognizing a UE speed (e.g., Doppler shift estimation or the like), and thus may determine dmrs-AdditionalPosition.

As described in FIG. 4, the base station 100 (particularly, a DU) may determine dmrs-AdditionalPosition=pos0 in which the number of DMRS symbols transmitted in a slot is 1 in the case that the movement speed of the UE 10 (UE speed) is lower than speedThresholdFor2Dmrs, and may determine dmrs-AdditionalPosition=post in which the number of DMRS symbols transmitted in a slot is 2 in the case that the movement speed of the UE 10 (UE speed) is higher than speedThresholdFor2Dmrs and lower than speedThresholdFor3Dmrs. In this manner, the base station device 100 may determine dmrs-AdditionalPosition having a large number of DMRS Symbols when the movement speed (UE speed) is fast.

Therefore, in the case that the number of DMRS symbols of dmrs-AdditionalPosition determined based on the movement speed of the UE 10 (UE speed) as described above is greater than that of a predetermined (present) DMRS configuration for the UE 10, the candidate selecting unit 110 may select, as a candidate DMRS configuration, the DMRS configuration of the corresponding dmrs-AdditionalPosition (e.g., configuration parameters remaining after excluding dmrs-AdditionalPosition are identical to those of the present DMRS configuration).

Figure 5:
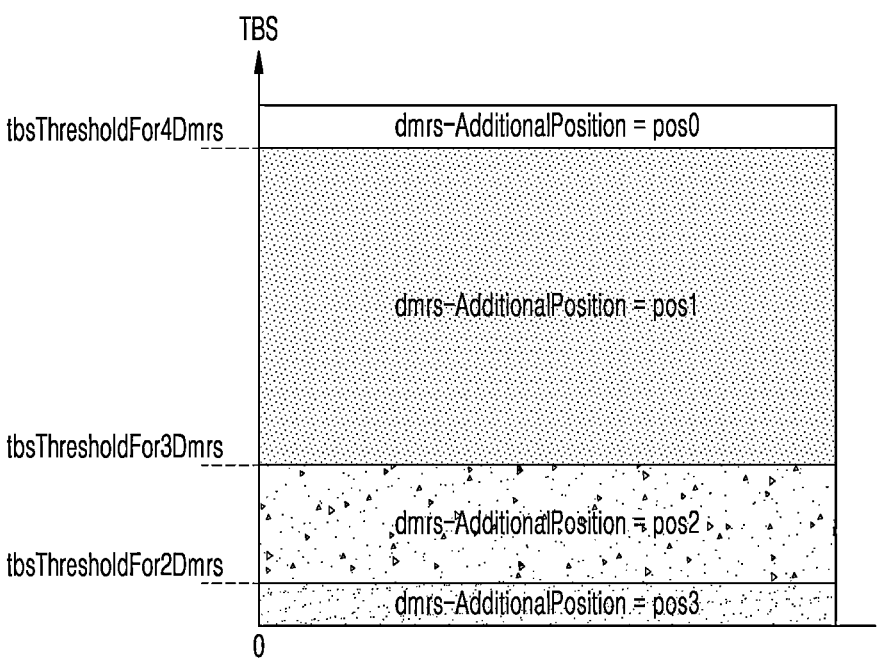

Referring to FIG. 5, an embodiment will be described with reference to a transmission environment based on the amount of transmission data of the UE 10 (e.g., the amount of data to be transmitted via a PDSCH/PUSCH).

For example, in the present disclosure, a candidate DMRS configuration may be selected via a scheme that differentially applies, based on the amount of transmission data, a dmrs-AdditionalPosition value related to the number of DMRS symbols.

For example, a threshold for the amount of transmission data may be differentially defined for differential application, for example, tbsThresholdFor2Dmrs, tbsThresholdFor3Dmrs, and tbsThresholdFor4Dmrs, as illustrated in FIG. 5.

Therefore, the base station device 100 (particularly, a DU) may recognize, as a transport block size (TBS), the amount of transmission data of the UE 10, that is, the amount of data to be transmitted in a PDSCH/PUSCH, and may determine dmrs-AdditionalPosition based on the TBS.

As described in FIG. 5, the base station 100 (particularly, a DU) may determine dmrs-AdditionalPosition=pos3 in which the number of DMRS symbols transmitted in a slot is 4 in the case that the amount of transmission data (TBS) of the UE 10 is lower than tbsThresholdFor2Dmrs, and may determine dmrs-AdditionalPosition=pos2 in which the number of DMRS symbols transmitted in a slot is 3 in the case that the amount of transmission data (TBS) of the UE 10 is higher than tbsThresholdFor2Dmrs and lower than tbsThresholdFor3Dmrs. In this manner, the base station device 100 may determine dmrs-AdditionalPosition having a large number of DMRS symbols when the amount of transmission data (TBS) is low.

Therefore, in the case that the number of DMRS symbols of dmrs-AdditionalPosition determined based on the amount of transmission data (TBS) of the UE 10 as described above is greater than that of a predetermined (present) DMRS configuration for the UE 10, the candidate selecting unit 110 may select, as a candidate DMRS configuration, the DMRS configuration of the corresponding dmrs-AdditionalPosition (e.g., configuration parameters remaining after excluding dmrs-AdditionalPosition are identical to those of the present DMRS configuration).

In the present disclosure, it is also possible to select a candidate DMRS configuration via a scheme/method different from the above-described embodiment associated with selecting of a candidate DMRS configuration.

The configuration controller 120 may apply a DMRS configuration selected in advance by the candidate selecting unit 110 to some slots of slots to which a predetermined (present) DMRS configuration for the UE 10 is applied.

That is, the base station device 100 (particularly, the configuration controller 120) may change to/update with a candidate DMRS configuration only for some slots among the slots to which the predetermined (present) DMRS configuration is applied to the UE 10, via the additionally proposed DCI-based dynamic DMRS configuration control scheme or DCI-based DMRS configuration update, as described above.

Here, some slots to which the candidate DMRS configuration is applied may be defined as slots selected based on a pattern configured in units of slots from among the slots to which the predetermined (present) DMRS configuration for the UE 10 is applied.

In the descriptions of detailed embodiments, among the slots to which the predetermined (present) DMRS configuration for the UE 10 is applied, slots that satisfy Slot_Index mod N=a may be selected as "some slots" to which the candidate DMRS configuration is to be applied.

That is, in the present disclosure, from among the slots to which the predetermined (present) DMRS configuration for the UE 10 is applied, "some slots" may be selected based on a predetermined pattern (Slot_Index mod N=a) configured in units of slots.

Therefore, the configuration controller 120 may change to/update with the candidate DMRS configuration only for some slots selected based on the predetermined pattern configured in units of slots and may apply the same, as described above, and may perform a procedure of determining an optimal DMRS configuration between the predetermined (present) DMRS configuration for the UE 10 and the candidate DMRS configuration.

In the detailed descriptions, the procedure of determining an optimal DMRS configuration may be a procedure of comparing a difference in data transmission performance between a slot to which the predetermined DMRS configuration is applied and a slot to which the candidate DMRS configuration is applied during the predetermined monitoring period (MonitoringPeriod), and determining the optimal DMRS configuration based on a comparison result.

More specifically, the configuration controller 120 may change to/update with the candidate DMRS configuration only for some slots for the UE 10, and may apply the same as described above, and then may compare a difference in data transmission performance between the slot to which the predetermined (present) DMRS configuration is applied and the slot to which the candidate DMRS configuration is applied, during the predetermined monitoring period (MonitoringPeriod).

In the case that the comparison result indicates that the slot to which the candidate DMRS configuration is applied shows better performance (e.g., greater than or equal to a predetermined threshold), the configuration controller 120 may determine the corresponding candidate DMRS configuration as the optimal DMRS configuration.

In the case that the candidate DMRS configuration is determined as the optimal DMRS configuration, the configuration controller 120 may apply the candidate DMRS configuration determined as the optimal DMRS configuration by changing, to the determined candidate DMRS configuration, DRMS configurations of the slots remaining after excluding a predetermined slot from among the respective slots in which DMRS transmission to the UE 10 is allocated.

Here, the "predetermined slot" excluded from application of the candidate DMRS configuration determined as the optimal candidate DMRS configuration, may be defined as a slot set based on a pattern configured in units of slots so as to maintain a default DMRS configuration among the respective slots in which DMRS transmission to the UE 10 is allocated.

In the detailed descriptions, among the respective slots in which DMRS transmission to the UE 10 is allocated, slots that satisfy Slot_Index mod N=b may be selected as "predetermined slots" to always maintain the default DMRS configuration.

That is, in the present disclosure, from among the respective slots in which DMRS transmission to the UE 10 is allocated, "predetermined slot" may be selected based on a predetermined pattern (Slot_Index mod N=b) configured in units of slots.

Accordingly, in the case that a candidate DMRS configuration is determined as an optimal DMRS configuration, the configuration controller 120 may apply the candidate DMRS configuration determined as the optimal DMRS configuration by changing/updating DRMS configurations of the slots remaining after excluding the predetermined slot set based on a predetermined pattern configured in units of slots, as described above, from among the respective slots in which DMRS transmission to the UE 10 is allocated.

That is, the configuration controller 120 may apply the candidate DMRS configuration by changing/updating the DMRS configurations of the slots remaining after excluding the predetermined slot for the UE 10, via the additionally proposed DCI-based dynamic DMRS configuration control scheme or DCI-based DMRS configuration update, as described above.

Conversely, in the case that the comparison result, obtained by comparing a difference in data transmission performance between the slot to which the (present) DMRS configuration is applied and the slot to which the candidate DMRS configuration is applied, indicates that the performance of the slot to which the candidate DMRS configuration is applied is not better, the configuration controller 120 may determine that the present DMRS configuration is an optimal DMRS configuration, and may apply the present DMRS configuration again by changing/updating the DMRS configurations of some slots.

Hereinafter, the configuration of the user equipment (UE) device 10 according to an embodiment of the present disclosure will be described in detail with reference to FIG. 2.

As illustrated in FIG. 2, the UE device 10 according to an embodiment of the present disclosure may include a configuration identifying unit 11 and a controller 12.

The entirety or at least a part of the configuration of the UE device 10 may be embodied in the form of a hardware module or a software module, or may be embodied in the form of a combination of a hardware module and a software module.

Here, the software module may be considered as, for example, an instruction executed by a processor that controls an operation in the UE device 10, and such an instruction may be in the form of being contained in the memory of the UE device 10.

The UE device 10 according to an embodiment of the present disclosure may embody an adaptive DMRS configuration control scheme proposed in the present disclosure according to the above-described configurations. Hereinafter, each configuration in the UE device 10 to embody the same will be described in detail.

The configuration identifying unit 11 may be in charge of a function that identifies, from a DCI transferred for scheduling, a configuration for RS transmission.

Here, a predetermined RS may be a DMRS used for channel estimation for demodulating data transmitted in at least one of a PDSCH and a PUSCH.

Hereinafter, for ease of description, detailed embodiments will be described by considering a predetermined RS as a DMRS.

That is, the configuration identifying unit 11 may identify a DMRS configuration for the UE device 100 itself using a DCI transmitted from the base station 100 via a PDCCH.

In this instance, in the present disclosure, the DMRS configuration identified from the DCI may correspond to an optimal DMRS configuration determined, by the base station 100, for each slot unit to which DMRS transmission to the UE device 10 is allocated.

Specifically, in the present disclosure, in order to determine/apply a DMRS configuration in units of slots by distinguishing some slots, a predetermined slot to be described later, and the like, an environment in which a DMRS configuration is controllable at a slot level may be assumed.

In the present disclosure, the detailed technology that realizes an environment in which a DMRS configuration is controllable at a slot level is not limited.

However, as described above, the present disclosure may additionally propose the DCI-based dynamic DMRS configuration control scheme and the DCI-based DMRS configuration update for embodying the environment.

Accordingly, the scheme in which the configuration identifying unit 11 identifies a DMRS configuration for the UE device 100 itself using a DCI may be performed according to the additionally proposed schemes, that is, the above-described DCI-based dynamic DMRS configuration control scheme and the DCI-based DMRS configuration update.

More specifically, the UE device 10 in the present disclosure may receive a DMRS configuration list including a plurality of pieces of DMRS configuration information from the base station 100, and may retain the same.

For example, in the present disclosure, in the case that the UE device 10 accesses, the base station 100 may identify, based on a UE capability information message, whether the UE device 10 is capable of supporting the DCI-based (dynamic) DMRS configuration control proposed in the present disclosure, and if supportable, the base station 100 may transmit a DMRS configuration list to the UE device 10 via an RRC message (e.g., rrcConnectionReconfiguration Message).

As described in the present disclosure, the DMRS configuration list transferred via the RRC message may be stored/contained in the UE device 10 in the form of Table 3 below.

Accordingly, describing with reference to FIG. 3, from the DMRS configuration list in an RRC message (e.g., rrcConnectionReconfiguration Message) received in advance, the configuration identifying unit 11 may identify DMRS configuration information "dmrsConfigID 2" to which index "01", which is included in a predetermined field (DMRS configuration index) in DCI transmitted from the base station 100 via a PDCCH, is mapped.

In the case of a downlink and an uplink, the controller 12 may process a DMRS by applying a DMRS configuration based on the DMRS configuration information identified by the configuration identifying unit 11 in advance.

That is, in the case of a DL, the controller 12 may apply the identified DMRS configuration for demodulation of transmission data, and in the case of a UL, the controller 12 may apply the identified DMRS configuration when DMRS scheduling in a PUSCH is performed. Accordingly, in the case of a DL and a UL, a DMRS may be processed according to the corresponding DMRS configuration.

As described above, in the present disclosure, the DCI-based dynamic DMRS configuration control scheme that transfers DMRS configuration information by using a transmitted DCI including scheduling information associated with a PDSCH/PUSCH may be implemented for a DMRS that is configured for each slot in which a PDSCH and a PUSCH are scheduled and is transmitted, and thus an environment in which a DMRS configuration is applicable/controllable based on a slot unit (slot level) in which a DCI is capable of being transmitted may be embodied.

In the above description, in association with embodying the DCI-based dynamic DMRS configuration control scheme of the present disclosure, an embodiment that applies/controls a DMRS configuration at a slot level by transmitting DMRS configuration information together with scheduling associated with an S-CH (PDSCH or PUSCH) to the UE 10, via DCI format update that additionally defines a predetermined field (DMRS configuration index) in an existing DCI format (e.g., DCI Format 1_0) has been described.

In addition, in association with embodying a DCI-based dynamic DMRS configuration control scheme of the present disclosure, an embodiment that applies/controls a DMRS configuration at a slot level by transmitting DMRS configuration information together with scheduling associated with an S-CH (PDSCH or PUSCH) to the UE 10, in a manner of additionally defiling a new DCI format for transmitting DMRS configuration information may also be available.

Furthermore, hereinafter, the DCI-based DMRS configuration update may be embodied via the above-described DCI-based dynamic DMRS configuration control scheme, and the descriptions thereof have been provided, and thus these will be omitted.

As described above, the present disclosure may enable the DCI-based DMRS configuration update by embodying an environment in which a DMRS configuration is applicable/controllable based on a slot unit (slot level) in which a DCI is capable of being transmitted, via the new type of DCI-based dynamic DMRS configuration control scheme. Accordingly, it is expected to be free from limitations of the existing RRC message or BWP switching-based DMRS configuration update scheme.

However, embodiment of the scheme provided in the present disclosure is not limited only to embodiment via the DCI-based dynamic DMRS configuration control scheme. The scheme of the present disclosure may be employed by combining with various methods capable of allocating DMRSs having different configurations at a slot level, such as such as producing a DMRS pattern and performing update via an RRC message.

Continuing the description again, since the DCI-based dynamic DMRS configuration control is enabled by the configuration identifying unit 11, the UE device 10 in the present disclosure may control a DMRS configuration based on a slot unit (slot level) in which a DCI is capable of being transmitted, and on these conditions, may apply an optimal DMRS configuration determined by the base station 100 for each slot to which DMRS transmission to the UE device 10 is allocated.

Figure 6:
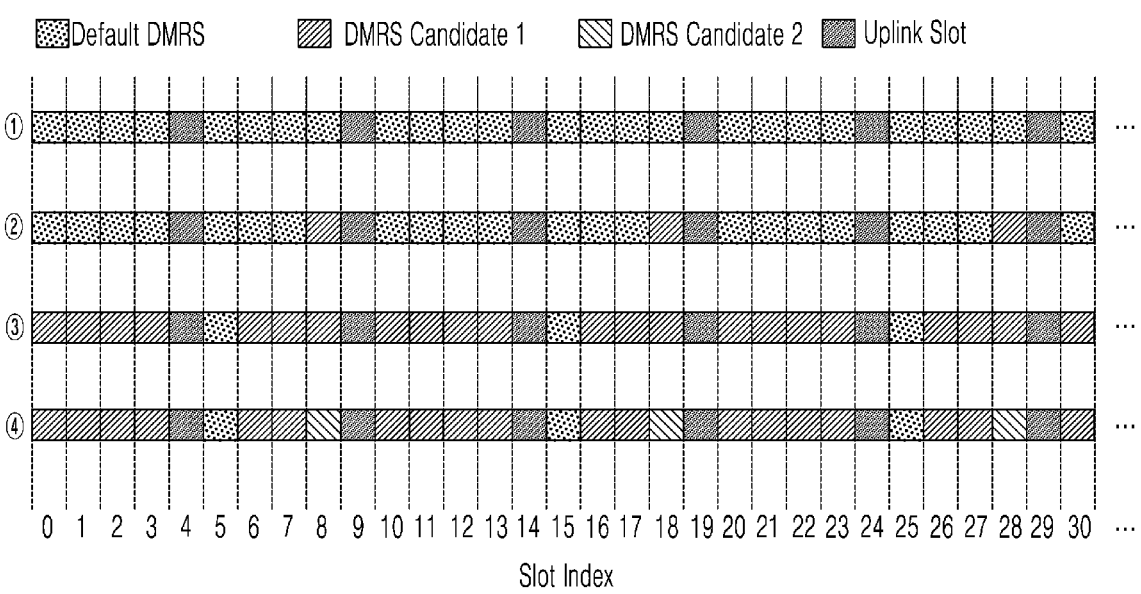
FIG. 6 is a diagram illustrating a process of determining an optimal DMRS configuration based on a slot unit-based DMRS pattern in the present disclosure.

FIG. 6 is a diagram illustrating a process of determining an optimal DMRS configuration based on a slot unit-based DMRS pattern, according to the adaptive DMRS configuration control scheme of the present disclosure.

In the case of a UE that performs transmission or reception of full-traffic since a large amount of data needs to be transmitted, a PDSCH or a PUSCH may be allocated for each slot, and in this instance, DMRS transmission may be allocated to each slot.

According to an embodiment illustrated in FIG. 6, a situation in which a PDSCH or a PUSCH, and DMRS transmission is allocated for each slot on the assumption that the UE 10 performs transmission or reception of full-traffic.

In addition, for ease of description, FIG. 6 illustrates a process of determining an optimal DMRS configuration in the case of downlink transmission.

The processes of determining an optimal DMRS configuration according to the adaptive DMRS configuration control scheme of the present disclosure described below may be equally applicable to uplink transmission.

In the present disclosure, the base station 100 may apply a default DMRS configuration that is normal to all slots in which DMRS transmission to the UE 10 is allocated (①).

In the present disclosure, in the case that a candidate DMRS configuration (DMRS candidate 1) is selected that may show better performance than that of the present DMRS configuration in consideration of a transmission environment associated with the UE 10, the base station device 100 may apply the configuration of DMRS candidate 1 to some slots that satisfy Slot_index Mod 10=8 (②).

In this instance, in the case that many candidate DMRS configurations are selected, candidate DMRS configurations may be respectively applied to "some slots" such as Slot_Index mod N=c, Slot_Index mod N=d, . . . , and the like.

In the present disclosure, a comparison result obtained by comparing a difference in performance during a monitoring period shows that the performance of some slots to which DMRS candidate 1 configuration is applied is better than the performance of a slot to which a default DMRS configuration is applied, the base station device 100 may apply the DMRS candidate 1 configuration to all the slots remaining after excluding a predetermined slot satisfying Slot_index Mod 10=5 from among all slots in which DMRS transmission to the UE 10 is allocated (③).

③ is the state in which the DMRS configurations of all the slots remaining after excluding the predetermined slot satisfying Slot_index Mod 10=5 are changed to/updated with DMRS candidate 1.

Conversely, in the present disclosure, in the case that the performance of a slot to which the default DMRS configuration is applied is better, the base station device 100 may apply the default DMRS configuration again to the some slots satisfying Slot_index Mod 10=8, and may return to state ①.

As described above, in the present disclosure, a predetermined slot that maintains application of the default DMRS configuration may be present, and this is to detect deterioration in performance caused by a change in a transmission environment or the like.

Accordingly, in the present disclosure, even in state ③, the base station device 100 may compare the performance of a predetermined slot to which the default DMRS configuration is applied with the performance of another slot, and in the case that the performance of the predetermined slot shows the best performance, may return to state ①.

Continuing the description from state ③, in the case that a candidate DMRS configuration (DMRS candidate 2) is selected that may show better performance than that of the present DMRS configuration (default, DMRS candidate 1)

in consideration of a transmission environment associated with the UE 10, the base station 100 may apply the configuration of DMRS candidate 2 to some slots that satisfy Slot_index Mod 10=8 (④).

Accordingly, in the present disclosure, in the case that a comparison result obtained by comparing performance during the monitoring period (MonitoringPeriod) shows that the performance of some slots to which the DMRS candidate 2 configuration is applied is better than the performance of a slot to which the present DMRS configuration (default, DMRS candidate 1) is applied, the base station device 100 may apply the DMRS candidate 2 configuration to all the slots remaining after excluding the predetermined slot, as described above.

In the present disclosure, at any time, the base station device 100 may compare the performance of a predetermined slot to which the default DMRS configuration is applied with the performance of another slot, and in the case that the performance of the predetermined slot shows the best performance, may return to state C).

As described above, according to embodiments of the present disclosure, on the condition of an environment in which a DMRS configuration is controllable based on a slot unit (slot level), a new type of adaptive DMRS configuration control scheme that is capable of determining/applying an optimal DMRS configuration for each slot unit to which a DMRS is allocated may be embodied.

Therefore, according to the present disclosure, an optimal DMRS configuration is capable of being applied for each slot unit. Accordingly, resources for data transmission of a PDSCH/PUSCH and stability of transmission or reception based on the accuracy of channel estimation may be guaranteed in balance and transmission quality and throughput may be increased.

Hereinafter, an embodiment of a DMRS configuration control method that realizes the adaptive DMRS configuration control scheme proposed in the present disclosure will be described with reference to FIG. 7.

Before providing a detailed description, it should be construed that an environment in which a DMRS configuration is controllable based on a slot unit (slot level) is assumed.

On the condition, according to the DMRS configuration control method of the present disclosure, the base station 100 may apply a predetermined DMRS configuration for the UE 10 to each slot to which DMRS transmission to UE 10 is allocated in operation S10.

In this instance, the predetermined DMRS configuration may be a default DMRS configuration, or may be a DMRS configuration that is determined as an optimal DMRS configuration via an optimal DMRS configuration determining procedure performed just before, and is currently applied.

In the following description, for ease of description, a description is provided by considering the predetermined present DMRS configuration as a default DMRS configuration.

In this instance, according to the DMRS configuration control method of the present disclosure, the UE 10 may process a DMRS by applying a default DMRS configuration in a DU/UL, for each slot to which DMRS transmission is allocated in operation S10.

According to the DMRS configuration control method of the present disclosure, the base station 100 may select a candidate DMRS configuration that may show better performance than that of the present DMRS configuration by taking into consideration the transmission environment associated with the UE 10, in operation S20.

In this instance, according to the DMRS configuration control method of the present disclosure, the base station 100 may apply a candidate DMRS configuration by changing to/updating with the candidate DMRS configuration only for some slots selected based on a predetermined pattern (e.g., Slot_Index mod N=a) configured in units of slots, and then may compare performance in data transmission between a slot to which a predetermined present (default) DMRS configuration for the UE 10 is applied and a slot to which a candidate DMRS configuration is applied in operation S30.

In this instance, according to the DMRS configuration control method of the present disclosure, in some slots among respective slots in which DMRS transmission is allocated, the UE 10 may process a DMRS by applying the candidate DMRS configuration in a DL/UL in operation S30.

According to the DMRS configuration control method of the present disclosure, in the case that the comparison result of operation S30 indicates that the slot to which the candidate DMRS configuration is applied shows better performance (e.g., Yes in operation S40, greater than or equal to a predetermined threshold), the corresponding candidate DMRS configuration may be determined as an optimal DMRS configuration.

In this manner, according to the DMRS configuration control method of the present disclosure, the base station 100 may the apply the candidate DMRS configuration determined as the optimal DMRS configuration by changing/updating the DMRS configurations of all the slots remaining after excluding a predetermined slot (maintaining a default DMRS configuration) set based on a predetermined pattern (e.g., Slot_Index mod N=b) configured in units of slots in operation S50.

In this instance, according to the DMRS configuration control method of the present disclosure, in the case of a DU/UL, the UE 10 may process a DMRS by applying the optimal DMRS configuration, obtained via change/update, to the remaining slots excluding the predetermined slot (maintaining a default DMRS configuration) among the respective slots in which DMRS transmission is allocated in operation S50.

As described above, according to the DMRS configuration control method of the present disclosure, on the assumption that a DMRS configuration is controllable based on a slot unit (slot level), the base station 100 may apply an optimal DMRS configuration determined for each slot unit to which DMRS transmission to the UE 10 is allocated.

According to the DMRS configuration control method of the present disclosure, in the case that a slot to which a predetermined (default) DMRS configuration is applied shows better performance (No in operation S40), the base station 100 may change again to/update again with the (default) DMRS configuration which was applied right before to the some slots in operation S70.

According to the DMRS configuration control method of the present disclosure, unless access of the UE 10 is not released (No in operation S60), the base station 100 may continuously perform operation S20 and subsequent operations so as to repeat a process of determining an optimal DMRS configuration based on a slot unit-based DMRS pattern.

Figure 7:
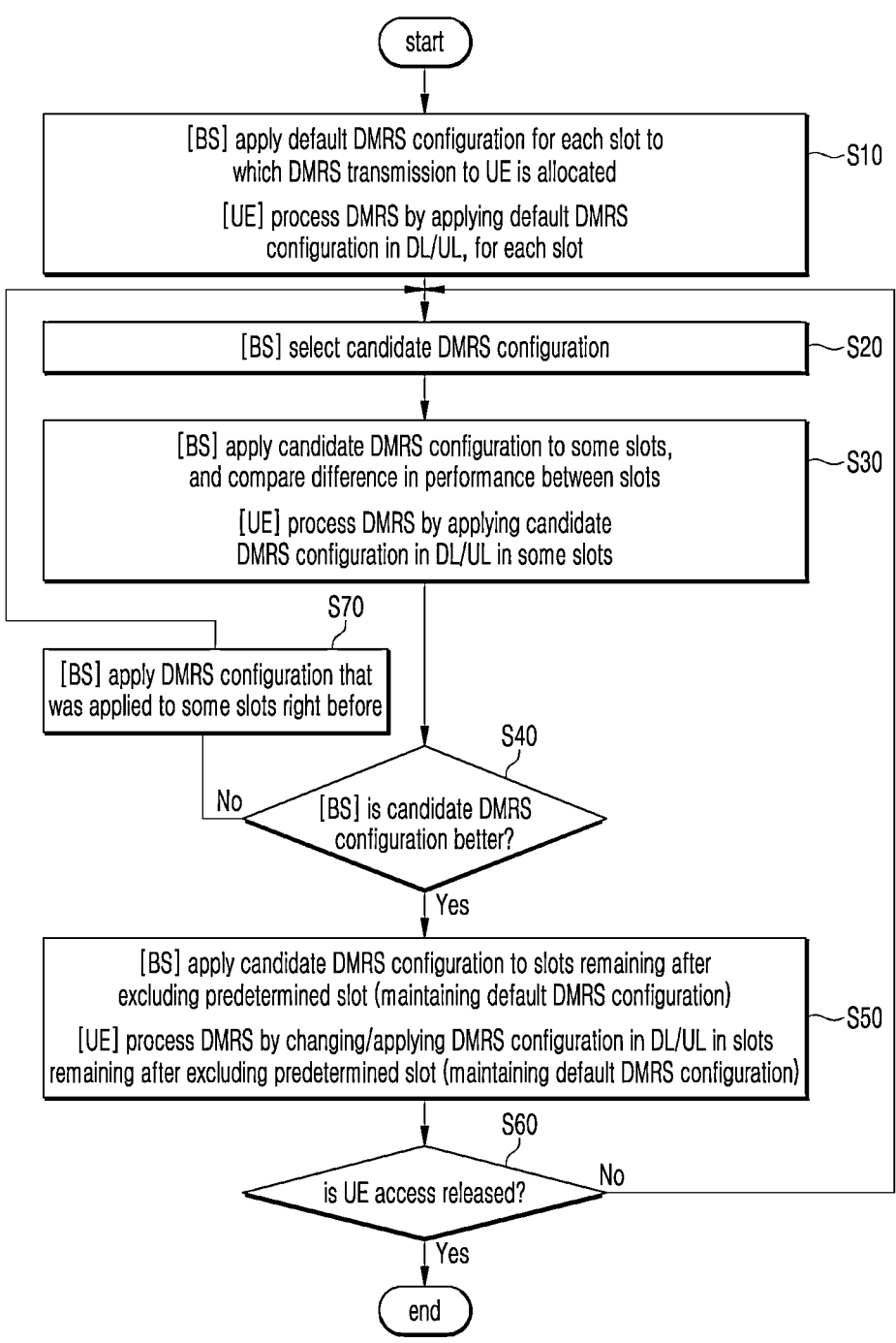
FIG. 7 is a flowchart illustrating a DMRS configuration control method according to an embodiment of the present disclosure.

Although not illustrated in FIG. 7, according to the DMRS configuration control method of the present disclosure, the base station 100 may compare, at any time, the performance of a predetermined slot to which a default DMRS configuration is applied and the performance of another slot. In the case that the performance of the predetermined slot shows the best performance, the base station 100 may proceed with operation S10 and may apply a default DMRS configuration to respective slots in which DMRS transmission to the UE 10 is allocated.

As described above, according to embodiments of the present disclosure, on the condition of an environment in which a DMRS configuration is controllable based on a slot unit (slot level), a new type of adaptive DMRS configuration control scheme that is capable of determining/applying an optimal DMRS configuration for each slot unit to which a DMRS is allocated may be embodied.

Therefore, according to the present disclosure, an optimal DMRS configuration is capable of being applied for each slot unit. Accordingly, resources for data transmission of a PDSCH/PUSCH and stability of transmission or reception based on the accuracy of channel estimation may be guaranteed in balance and transmission quality and throughput may be increased.

Furthermore, in the present disclosure, an adaptive DMRS configuration control scheme, which is a scheme different from the above description, may be further proposed.

For example, referring to FIG. 4, as a scheme of differentially applying, based on a UE movement speed, a dmrs-AdditionalPosition value related to the number of DRMS symbols, an adaptive DMRS configuration control scheme that changes/updates a DRMS configuration in real time may be proposed.

Briefly describing, the base station device 100 (particularly, a DU) may recognize the movement speed of the UE 10 (UE speed) via various existing schemes capable of recognizing a UE speed (e.g., Doppler shift estimation or the like).

Furthermore, in the present disclosure, a threshold for a movement speed (UE speed) may be differentially defined for differential application, for example, speedThresholdFor2Dmrs, speedThresholdFor3Dmrs, and speedThresholdFor4Dmrs, as illustrated in FIG. 4.

Accordingly, the base station device 100 (particularly, a DU) may determine dmrs-AdditionalPosition=pos0 in which the number of DMRS symbols transmitted in a slot is 1 in the case that the movement speed of the UE 10 (UE speed) is lower than speedThresholdFor2Dmrs, and may determine dmrs-AdditionalPosition=pos1 in which the number of DMRS symbols transmitted in a slot is 2 in the case that the movement speed of the UE 10 (UE speed) is higher than speedThresholdFor2Dmrs and lower than speedThresholdFor3Dmrs. In this manner, the base station device 100 may determine dmrs-AdditionalPosition having a large number of DMRS Symbols when the movement speed (UE speed) is fast.

The base station device 100 (e.g., the configuration controller 120) may change the DMRS configurations of all slots to which a predetermined (present) DMRS configuration for the UE 10 is applied, to a predetermined DMRS configuration (e.g., configuration parameters remaining after excluding dmrs-AdditionalPosition are the same as those of the present DMRS configuration) of dmrs-AdditionalPosition determined according to a movement speed (UE speed).

The above-described embodiment may be embodied without assuming an environment in which a DMRS configuration is controllable at a slot level.

Describing with reference to FIG. 5, as a scheme of differentially applying, based on the amount of transmission data (the amount of data to be transmitted in a PDSCH/PUSCH) of the UE 10, a dmrs-AdditionalPosition value related to the number of DRMS symbols, an adaptive DMRS configuration control scheme that changes/updates a DRMS configuration in real time may be proposed.

Briefly describing, in the present disclosure, a threshold for the amount of transmission data may be differentially defined for differential application, for example, tbsThresholdFor2Dmrs, tbsThresholdFor3Dmrs, and tbsThresholdFor4Dmrs, as illustrated in FIG. 5.

Therefore, the base station device 100 (particularly, a DU) may recognize, as a transport block size (TBS), the amount of transmission data of the UE 10, that is, the amount of data to be transmitted in a PDSCH/PUSCH.

Accordingly, the base station device 100 (particularly, a DU) may determine dmrs-AdditionalPosition=pos3 in which the number of DMRS symbols transmitted in a slot is 4 in the case that the amount of transmission data (TBS) of the UE 10 is lower than tbsThresholdFor2Dmrs, and may determine dmrs-AdditionalPosition=pos2 in which the number of DMRS symbols transmitted in a slot is 3 in the case that the amount of transmission data (TBS) of the UE 10 is higher than tbsThresholdFor2Dmrs and lower than tbsThresholdFor3Dmrs. In this manner, the base station device 100 may determine dmrs-AdditionalPosition having a large number of DMRS symbols when the amount of transmission data (TBS) is low.

The base station 100 (e.g., the configuration controller 120) may change the DMRS configurations of all slots to which a predetermined (present) DMRS configuration for the UE 10 is applied, to a predetermined DMRS configuration (e.g., configuration parameters remaining after excluding dmrs-AdditionalPosition are the same as those of the present DMRS configuration) of dmrs-AdditionalPosition determined according to the amount of transmission data (IBS), as described above.

The above-described embodiment may be embodied without assuming an environment in which a DMRS configuration is controllable at a slot level.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) may be written in any form of programming language, including compiled or interpreted languages, declarative or procedural languages, and it may be deployed in any form, including as a standalone program or module, a component, subroutine, or another unit suitable for use in a computer environment. A computer program may, but need not, correspond to a file in a file system. A program may be stored in a single file provided to the requested program, in multiple coordinated files (for example, files that store one or more modules, sub-programs, or portions of code), or in a portion of a file that holds other programs or data (for example, one or more scripts stored in a markup language document). A computer program may be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims as described below, rather than the above detailed description. Accordingly, it should be understood that all modifications or variations derived from the meaning and scope of the appended claims and equivalents thereof fall within the scope of the present disclosure.

What is claimed is:

1. A base station device comprising:
a candidate selecting unit configured to select a candidate reference signal (RS) configuration based on a transmission environment associated with a user equipment (UE); and
a configuration controller configured to apply the candidate RS configuration to at least one of slots to which a predetermined RS configuration for the UE is applied, and determine an optimal RS configuration between the predetermined RS configuration for the UE and the candidate RS configuration,
wherein, in response to determination that the candidate RS configuration is the optimal RS configuration, the configuration controller applies the candidate RS configuration by changing RS configurations applied to remaining slots excluding a predetermined slot from slots for the RS transmission to the UE, to the candidate RS configuration.

2. The base station device of claim 1, wherein the RS is a demodulate reference signal (DMRS) used for channel estimation for demodulating data transmitted in at least one of a physical downlink shared channel (PDSCH) and a physical uplink shared channel (PUDSCH).

3. The base station device of claim 1, wherein the at least one of slots is selected from the slots to which the predetermined RS configuration is applied based on a pattern for each of the slots.

4. The base station device of claim 1, wherein the configuration controller compares data transmission performance between a slot to which the predetermined RS configuration is applied and a slot to which the candidate RS configuration is applied during a predetermined monitoring period (MonitoringPeriod), and determines the optimal RS configuration based on a comparison result.

5. The base station device of claim 1, wherein the predetermined slot is set based on a pattern for each of slots to maintain a default RS configuration with respect to slots for the RS transmission to the UE.

6. The base station device of claim 5, wherein the configuration controller compares data transmission performance between the predetermined slot and the remaining slots, and applies the default RS configuration to all slots for the RS transmission to the UE when the performance of the predetermined slot is better.

7. The base station device of claim 1, wherein the transmission environment associated with the UE is based on at least one of an amount of transmission data, a movement speed of the UE, and a success rate of data transmission, and wherein the candidate selecting unit selects, as the candidate RS configuration, an RS configuration having a larger number of symbols of the RS transmitted in a slot than that of the predetermined RS configuration for the UE when the amount of transmission data is smaller than a preset value, the movement speed of the UE is faster than a preset value or the success rate of data transmission is lower than a preset value.

8. A user equipment (UE) device comprising:

a configuration identifying unit configured to identify, from downlink control information (DCI) transferred from a base station for scheduling, a reference signal (RS) configuration for transmission of the RS; and a controller configured to process the RS by applying the identified RS configuration in a case of a downlink and an uplink, wherein the RS configuration for each of remaining slots excluding a predetermined slot for slots for the RS transmission to the UE is an optimal RS configuration determined by the base station, and wherein the base station selects a candidate RS configuration based on a transmission environment associated with the UE, applies the candidate RS configuration to at least one of slots to which a predetermined RS configuration for the UE is applied, and determines the optimal RS configuration between the predetermined RS configuration and the candidate RS configuration.

9. The UE device of claim 8, wherein the RS is a demodulate reference signal (DMRS) used for channel estimation for demodulating data transmitted in at least one of a physical downlink shared channel (PDSCH) and a physical uplink shared channel (PUDSCH).

10. The UE device of claim 8, wherein the optimal RS configuration is determined via an optimal RS configuration determining procedure performed by the base station.

11. A reference signal (RS) configuration control method performed by a base station device, the method comprising:

selecting a candidate RS configuration based on a transmission environment associated with a user equipment (UE);

performing a procedure of applying the candidate RS configuration to at least one of slots to which a predetermined RS configuration for the UE is applied, and determining an optimal RS configuration between the predetermined RS configuration for the UE and the candidate RS configuration; and applying, in response to determination that the candidate RS configuration is an optimal RS configuration, the candidate RS configuration by changing RS configurations applied to remaining slot excluding a predetermined slot from slots for the RS transmission to the UE to the candidate RS configuration.

12. The method of claim 11, wherein the at least one of slots is selected from the slots to which the predetermined RS configuration is applied based on a pattern for each of the slots.

13. The method of claim 11, wherein the procedure of determining the optimal RS configuration comprises comparing data transmission performance between a slot to which the predetermined RS configuration is applied and a slot to which the candidate RS configuration is applied during a predetermined monitoring period (MonitoringPeriod), and determining an optimal RS configuration based on a comparison result.

14. The method of claim 11, wherein the predetermined slot is a slot set based on a pattern for each of slots to maintain a default RS configuration with respect to slots for the RS transmission to the UE.

15. A reference signal (RS) configuration control method performed by a user equipment (UE) device, the method comprising:

identifying, from downlink control information (DCI) transferred from a base station for scheduling, a RS configuration for RS transmission; and controlling the RS by applying the identified RS configuration in a case of a downlink and an uplink, wherein the RS configuration for each of remaining slots excluding a predetermined slot from slots for the RS transmission to the UE is an optimal RS configuration determined by the base station, and wherein the base station selects a candidate RS configuration based on a transmission environment associated with the UE, applies the candidate RS configuration to at least one of slots to which a predetermined RS configuration for the UE is applied, and determines the optimal RS configuration between the predetermined RS configuration and the candidate RS configuration.

\* \* \* \* \*